(No Model.) 2 Sheets—Sheet 1.

S. NORTON.
STORM GUARD FOR VEHICLES.

No. 569,466. Patented Oct. 13, 1896.

WITNESSES:

INVENTOR
S. Norton
BY
Munn & Co.
ATTORNEYS (No Model.) 2 Sheets—Sheet 2.

S. NORTON.
STORM GUARD FOR VEHICLES.

No. 569,466. Patented Oct. 13, 1896.

WITNESSES:

INVENTOR
S. Norton.
BY
Munn &Co
ATTORNEYS

UNITED STATES PATENT OFFICE.

SYLVANUS NORTON, OF SINCLAIRVILLE, NEW YORK.

STORM-GUARD FOR VEHICLES.

SPECIFICATION forming part of Letters Patent No. 569,466, dated October 13, 1896.

Application filed December 18, 1895. Serial No. 572,545. (No model.)

*To all whom it may concern:*

Be it known that I, SYLVANUS NORTON, of Sinclairville, in the county of Chautauqua and State of New York, have invented a new and Improved Storm-Guard for Vehicles, of which the following is a full, clear, and exact description.

My invention relates to an improvement in storm guards and aprons for vehicles; and the object of the invention is to so construct a storm-guard that it may be expeditiously and conveniently secured in front of a vehicle, as, for example, a top-carriage or a top-sleigh, and which when placed in position will as completely close the conveyance as though it were a tight carriage.

Another object of the invention is to so construct the storm-guard that it will be simple, durable, and economic, and, furthermore, to provide a device by means of which the guard may be readily and quickly attached to the dashboard of the vehicle.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
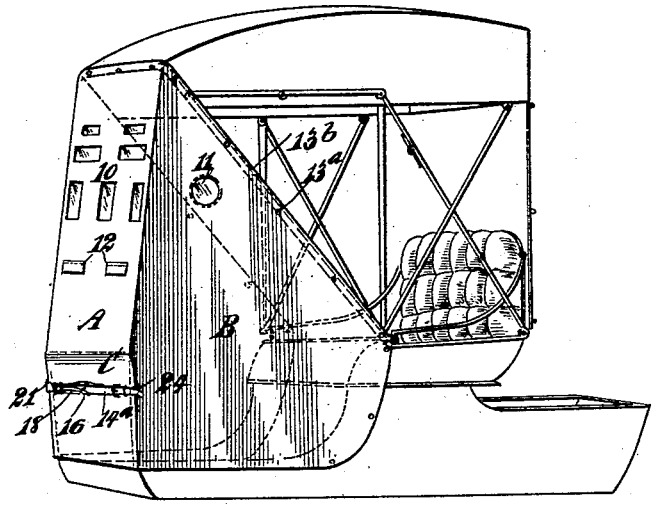
Figure 2:
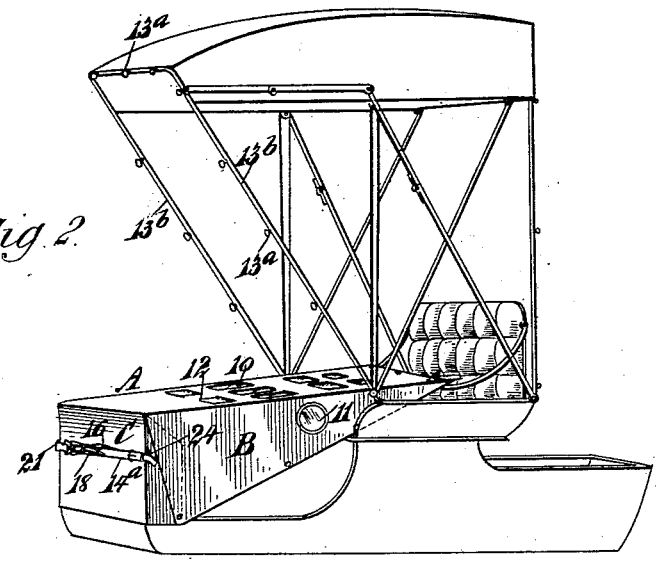
Figure 3:
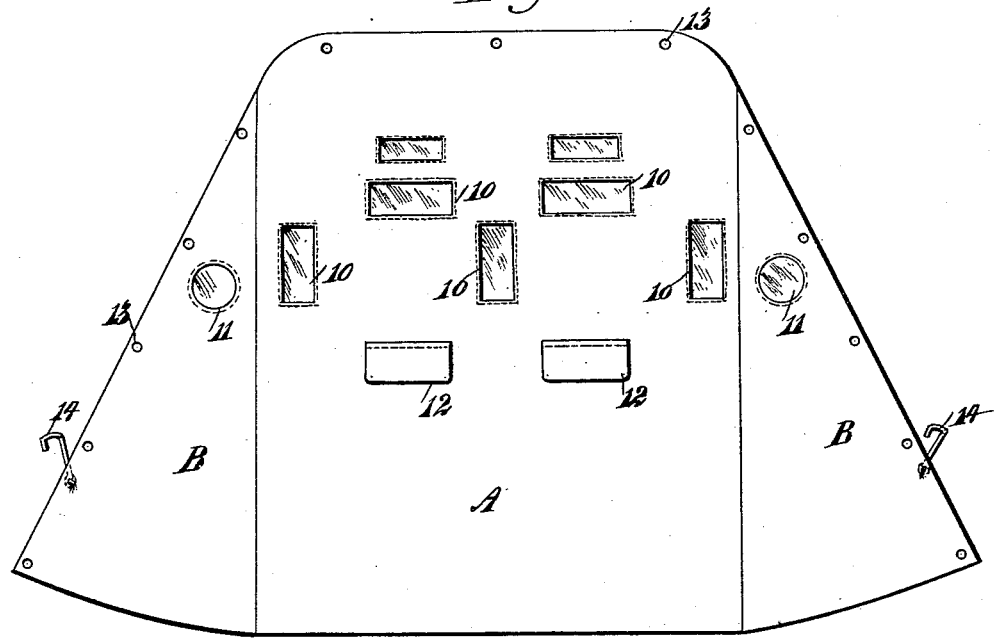
Figure 4:
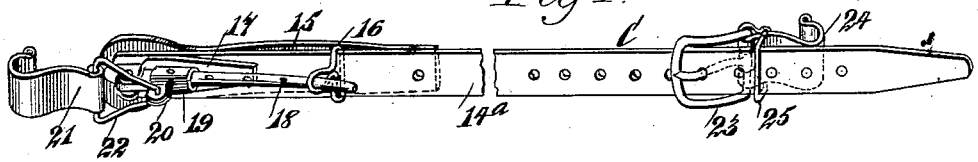
Figure 5:
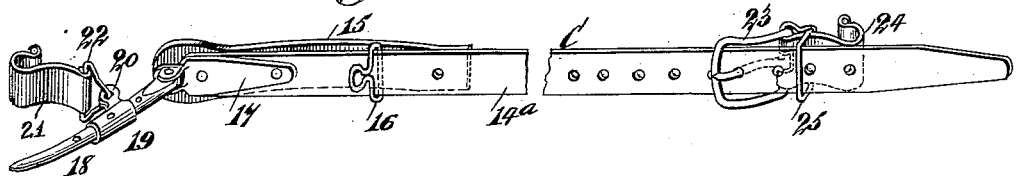

Figure 1 is a perspective view of a top-buggy having the improvement applied thereto. Fig. 2 is a perspective view of a top-buggy, showing the storm-guard utilized as an apron. Fig. 3 is a plan view of the storm-guard; and Figs. 4 and 5 are perspective views of the locking or attaching device, showing the same in two positions.

In carrying out the invention the storm-guard is made preferably of a waterproof material, such as, for example, a fabric, and comprises a front A and sides B, the sides being substantially of triangular shape, and they are secured to the side edges of the front in such manner that when the front is placed in front of the dashboard the sides will be at the side portions of the vehicle.

The front A has any desired number of openings 10 made therein, and each opening 10 is preferably provided with a pane of glass or other transparent material, and these openings and their transparent coverings are so placed as to afford the occupant of the vehicle the best possible view of the road in front and at the sides; and in order that the occupant may be able to see the road clearly in making a turn, openings 11 are made in the side pieces B, being likewise covered with glass or with a transparent material, as illustrated; and, furthermore, in the front section of the guard A additional openings are made, adapted to be covered by flaps 12, through which openings the driving-reins are adapted to extend to the interior of the vehicle. The whip may pass through one of the openings 12, whereby the handle of the whip will be inside the hood and the lash outside.

At the margin of the entire guard apertures 13 are preferably made, and these apertures are in the nature of buttonholes, being adapted for engagement with buttons or studs 13ª, which are located upon the forward bow 13ᵇ of the vehicle-top, and at the margin of each of the side pieces B a hook 14 or its equivalent is secured, and these hooks are preferably so placed that they may be carried to an engagement with the bows of the carriage-top, where they connect with the body of the carriage; or the aforesaid hooks may be attached to the side rails of the seat or to any other convenient point at the sides of the body of the vehicle.

An attaching or locking device C is employed in connection with the aforesaid curtain, the said attaching device being constructed as shown particularly in Figs. 4 and 5. This attaching device or locking device C consists of a strap 14ª, and the said strap at one of its ends is provided with an additional attached strap 15, forming a guide and a limit of movement for a loop 16, which is made to travel on the main strap 14ª.

A plate 17 is firmly secured to the end of the strap 17, at which the additional strap 15 is located, and ears are formed on the metal plate 17, between which the inner end of a lever 18 is fulcrumed. This lever is provided with a sleeve 19, loosely mounted on said lever and adjustably attached thereto by passing a pin or its equivalent through an opening in the sleeve and a registering opening in the said lever, so that the sleeve may be removed a greater or a less distance from the fulcrum of the lever, as found desirable. The sleeve 19 is furthermore provided with an extension 20, and a hook 21 or a like device is pivotally attached to the extension of the aforesaid lever-sleeve by means of a link 22.

A buckle 23 is in adjustable engagement with that end of the strap opposite which the lever 18 is fulcrumed, and the said buckle 23 is provided with a hook 24 or equivalent device pivotally connected therewith, facing in an opposite direction to the hook 21 at the opposite end of the attaching device; and a loop 25 is also preferably attached to the aforesaid hook 24, as shown in both Figs. 4 and 5, the strap 14ª, after its attachment to the buckle, being passed through this loop.

In the operation of the device the storm guard or curtain is buttoned onto the front bow of the carriage-top and to the sides of body, the front section A passing preferably over the outside of the dashboard of the vehicle, and the hooks 14 are engaged with a suitable supporting-surface of the vehicle. The hooks 21 and 24 of the attaching device are made to clamp the curtain to the dashboard, and the lever 18 is then carried downward and inward to an engagement practically parallel with the strap 14ª, so as to tighten the said hooks and bring them in close clamping engagement with the sides of the dashboard and the material of the guard in contact with the said edges, and the lever is held in its take-up or clamping position by means of the loop 16, adjustable on the strap 14ª, while the degree of take-up that is required may be adjusted by the adjusting-sleeve 19 of the take-up lever 18, and also by the adjusting-buckle 23 of the strap 14ª.

It will thus be readily observed that after the guard is attached to the hood, dashboard, and sides of the body of the vehicle the vehicle can be made practically a closed one, and in the event the guard is not required to close the entire front of the vehicle it may be used as an apron, forming a complete pocket at the front of the vehicle, when it will effectually protect the lower extremities of the occupant of the vehicle; and it is further obvious that, owing to the side sections of the guard, when it is used as an apron the front section may be doubled up or otherwise manipulated so as to protect the panes of glass contained therein.

Having thus described my invention, I claim as new and desire to secure by Letters Patent—

1. A device for attaching the hoods, storm guards or aprons to the dash of a vehicle, the said device comprising a strap, a clamping device secured to one end of the strap, a take-up lever connected with the opposite end of the strap, and a second clamping device connected with the said take-up lever, as and for the purpose specified.

2. A locking device for the storm curtains, aprons or guards of vehicles, the same consisting of a strap, a clamping device adjustably connected with one end of the strap, a take-up lever fulcrumed upon the opposite end of the strap, a second clamping device connected with the aforesaid lever, and a locking device for the lever, as and for the purpose specified.

3. A locking device for storm aprons and guards of vehicles, the same consisting of a strap, a clamp adjustably attached to one end portion of the strap, a take-up lever fulcrumed at or near the opposite end of the strap, a second clamping device adjustably connected with the aforesaid take-up lever, and a lock carried by the strap and adapted for engagement with the aforesaid take-up lever, as and for the purpose specified.

4. A locking device for storm aprons, guards and the like for vehicles, the same consisting of a body-strap and a buckle adjustably connected with one end of the strap, a clamping device attached to the said buckle, a take-up lever fulcrumed at the opposite end of the said body-strap, having openings therein, a sleeve adjustable on the said lever, means for attaching the sleeve positively to the lever, a second clamping device in pivotal connection with the aforesaid sleeve, and a lock link or loop on the body-strap adapted to receive an end of the take-up lever, substantially as shown and described.

SYLVANUS NORTON.

Witnesses:
M. B. PRATT,
A. L. SHELTERS.